United States Patent
Ozturk et al.

(10) Patent No.: US 11,903,032 B2
(45) Date of Patent: Feb. 13, 2024

(54) DOWNLINK DATA TRANSMISSION IN RRC INACTIVE MODE

(71) Applicant: QUALCOMM Incorporated, San Diego, CA (US)

(72) Inventors: Ozcan Ozturk, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/529,736

(22) Filed: Aug. 1, 2019

(65) Prior Publication Data

US 2020/0053791 A1 Feb. 13, 2020

Related U.S. Application Data

(60) Provisional application No. 62/718,360, filed on Aug. 13, 2018.

(51) Int. Cl.
*H04W 76/27* (2018.01)
*H04W 74/08* (2009.01)
(Continued)

(52) U.S. Cl.
CPC ....... *H04W 74/0833* (2013.01); *H04L 1/0061* (2013.01); *H04W 68/005* (2013.01);
(Continued)

(58) Field of Classification Search
CPC ..... H04W 76/27; H04W 76/11; H04W 68/00; H04W 72/042; H04W 74/0833; H04W 76/19; H04W 68/005; H04L 1/0061
See application file for complete search history.

(56) References Cited

U.S. PATENT DOCUMENTS

2005/0281269 A1 12/2005 Choi
2016/0105927 A1 4/2016 Lee et al.
(Continued)

FOREIGN PATENT DOCUMENTS

TW 201735580 A 10/2017
WO 2018026139 A1 2/2018
(Continued)

OTHER PUBLICATIONS

Ericsson (Rapporteur): "Report of Email Discussion: [96#31] [NR] UL Data in Inactive Solution B", 3GPP Draft, 3GPP TSG-RAN WG2 NR Adhoc Meeting, R2-1700626—Report-Email-Discussion-31-Small Data TX-Solution-B-FV, 3rd Generation Partnership Project (3GPP), Mobile Competence Centre, vol. RAN WG2. No. Spokane, USA, Jan. 17, 2017-Jan. 19, 2017, Jan. 24, 2017 (Jan. 24, 2017), XP051224004, pp. 1-28, Retrieved from the Internet: URL: http://www.3gpp.org/ftp/tsg_ran/WG2_RL 2/TSGR2_AHs/2017_01_NR/Docs/ [retrieved on Jan. 24, 2017] Par. 4.
(Continued)

*Primary Examiner* — Anez C Ebrahim
(74) *Attorney, Agent, or Firm* — Procopio, Cory, Hargreaves & Savitch

(57) ABSTRACT

An apparatus receives a small data transmission during an RRC inactive mode, without transitioning the UE to an RRC connected mode. The UE receives a page from a base station for a downlink data transmission while in the RRC inactive mode. The page may indicate a downlink data transmission to occur without transitioning the UE to an RRC connected mode and may indicate a RACH preamble to the UE. The UE transmits a random access preamble to the base station in response to the page and receives a downlink data packet from the base station while remaining in the RRC inactive mode.

64 Claims, 12 Drawing Sheets

(51) Int. Cl.
*H04W 68/00* (2009.01)
*H04W 76/19* (2018.01)
*H04L 1/00* (2006.01)
*H04W 76/11* (2018.01)
*H04W 72/23* (2023.01)

(52) U.S. Cl.
CPC ............ *H04W 72/23* (2023.01); *H04W 76/11* (2018.02); *H04W 76/19* (2018.02); *H04W 76/27* (2018.02)

(56) References Cited

U.S. PATENT DOCUMENTS

| | | | |
|---|---|---|---|
| 2018/0035369 A1 | 2/2018 | Hahn et al. | |
| 2018/0049244 A1 | 2/2018 | Lee | |
| 2018/0192436 A1* | 7/2018 | Yi | H04W 72/14 |
| 2018/0213452 A1* | 7/2018 | Kim | H04L 5/0053 |
| 2019/0268750 A1* | 8/2019 | Lee | H04W 8/24 |
| 2020/0037210 A1* | 1/2020 | Rugeland | H04W 36/0033 |

FOREIGN PATENT DOCUMENTS

| | | | |
|---|---|---|---|
| WO | 2018064407 A1 | 4/2018 | |
| WO | 2018088840 A1 | 5/2018 | |
| WO | 2018142207 A1 | 8/2018 | |

OTHER PUBLICATIONS

International Search Report and Written Opinion—PCT/US2019/044885—ISA/EPO—dated Oct. 31, 2019.
Samsung: "Random Access Procedure for RRC Inactive State", 3GPP Draft, 3GPP TSG-RAN2 101bis, R2-1804314_RA Procedure for RRC Inactive State, 3rd Generation Partnership Project (3GPP), Mobile Competence Centre, vol. RAN WG2, No. Sanya, China, Apr. 16, 2018-Apr. 20, 2018, Apr. 14, 2018 (Apr. 14, 2018), XP051428064, pp. 1-3, Retrieved from the Internet: URL:http://www.3gpp.org/ftp/Meetings%5F3GPP%5FSYNC/RAN2/Docs/ [retrieved on Apr. 14, 2018] Par. 1 p. 2, lines 2-5 p. 2, lines 8-10.
ZTE et al., "Consideration on DL Data Transmission in RRC_Inactive State", 3GPP Draft, 3GPP TSG-RAN WG2 #97, R2-1701929 Consideration on DL Data Transmission in RRC_Inactive, 3rd Generation Partnership Project (3GPP), Mobile Competence Centre, vol. RAN WG2, No. Athens, Greece, Feb. 13, 2017-Feb. 17, 2017, Feb. 4, 2017 (Feb. 12, 2017), XP051212463, pp. 1-4, Retrieved from the Internet: URL:http://www.3gpp.org/ftp/Meetings_3GPP_SYNC/RAN2/Docs/ [retrieved on Feb. 12, 2017] p. 1. line 29 p. 3, lines 19-22.
Taiwan Search Report—TW108127721—TIPO—dated Aug. 21, 2022.

* cited by examiner

DOWNLINK DATA TRANSMISSION IN RRC INACTIVE MODE

CROSS REFERENCE TO RELATED APPLICATION

This application claims the benefit of U.S. Provisional Application Ser. No. 62/718,360, entitled "Downlink Data Transmission in RRC Inactive Mode" and filed on Aug. 13, 2018, which is expressly incorporated by reference herein in its entirety.

BACKGROUND

Technical Field

The present disclosure relates generally to communication systems, and more particularly, to data transmission between a base station and a User Equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a UE. The apparatus enters an RRC inactive mode. The apparatus receives a page from a base station for a downlink data transmission while in the RRC inactive mode. The apparatus transmits a random access preamble to the base station in response to the page and receives a downlink data packet from the base station while remaining in the RRC inactive mode. For example, the downlink data packet may be received without the UE transitioning to an RRC connected mode.

In another aspect of the disclosure, a method, a computer-readable medium, and an apparatus are provided for wireless communication at a base station. The apparatus transmits a page to a UE in an RRC inactive mode for a downlink data transmission. The apparatus receives a random access preamble from the UE in response to the page and transmits a downlink data packet to the UE while the UE remains in the RRC inactive mode. For example, the downlink data packet may be transmitted without transitioning the UE to an RRC connected mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
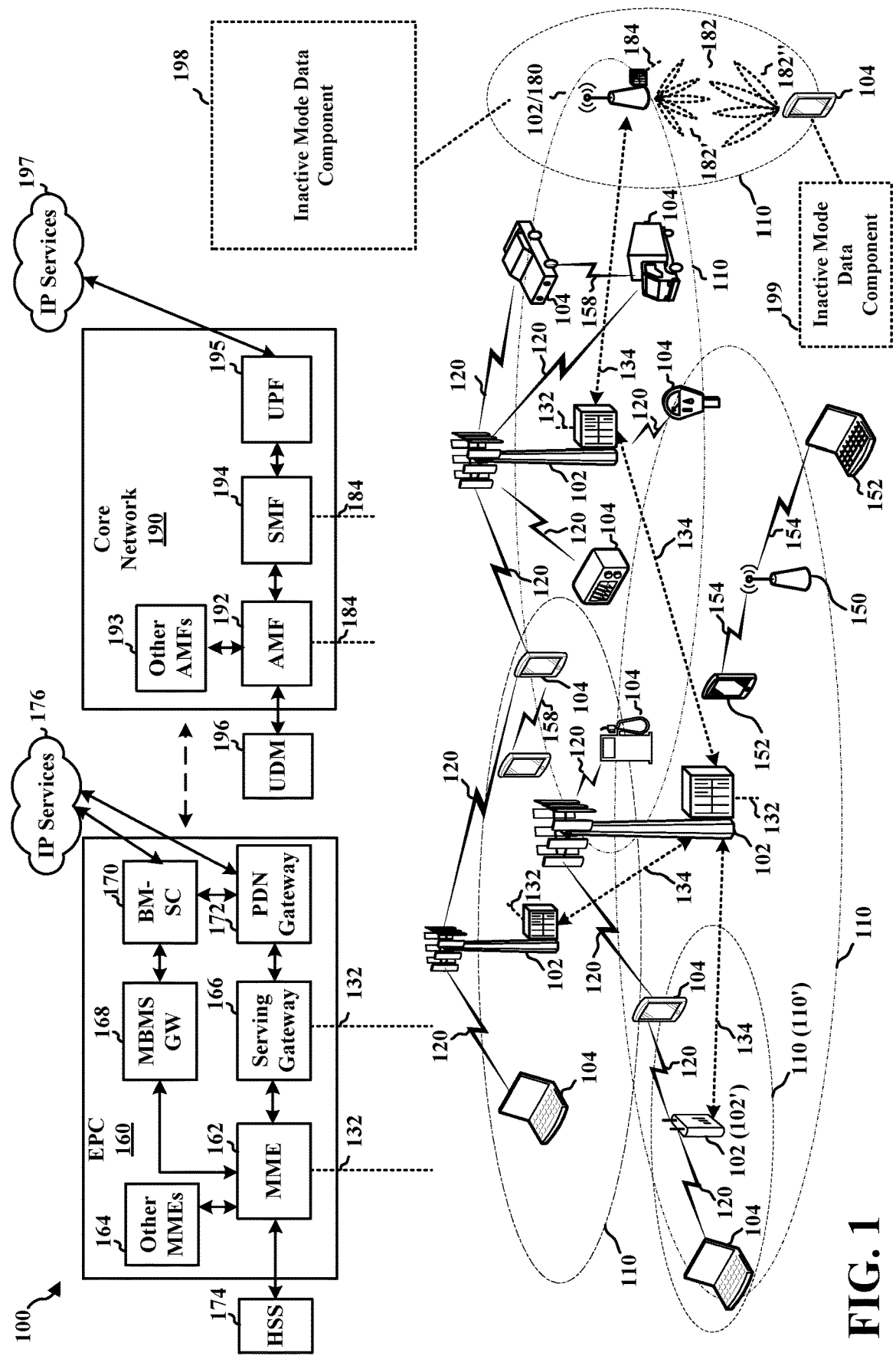
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may comprise an inactive mode data component 198 configured to transmit downlink data to UE 104 while the UE is in an inactive mode, without transitioning to an RRC connected mode. Similarly, UE 104 may comprise an inactive mode data component 199 configured to receive downlink data from base station 180 while in an RRC inactive mode. Although the following description may provide examples that involve 5G NR, the concepts described herein may be applicable to other similar areas, such as LTE, LTE-A, CDMA, GSM, and other wireless technologies.

Figure 2:
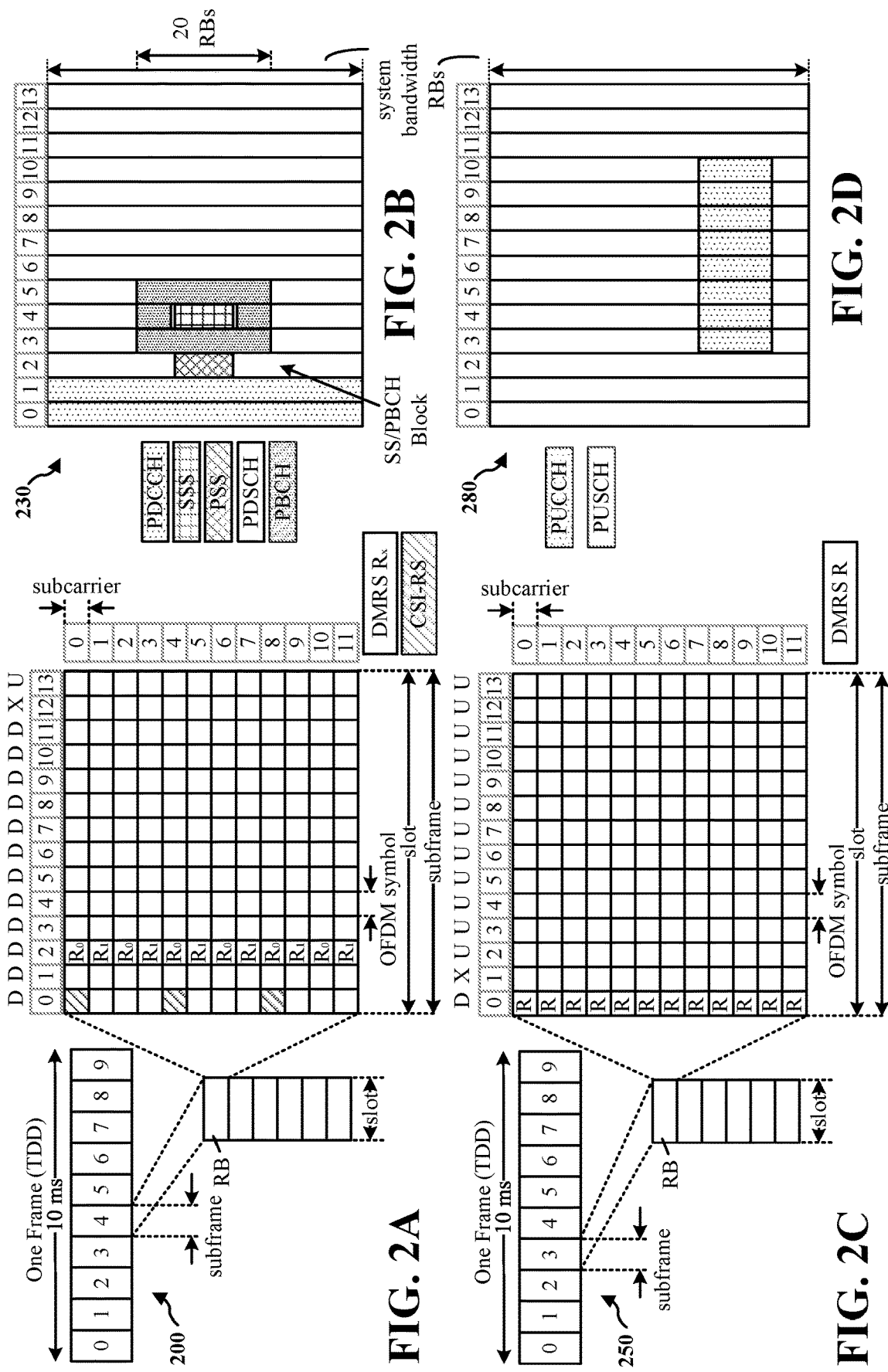
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
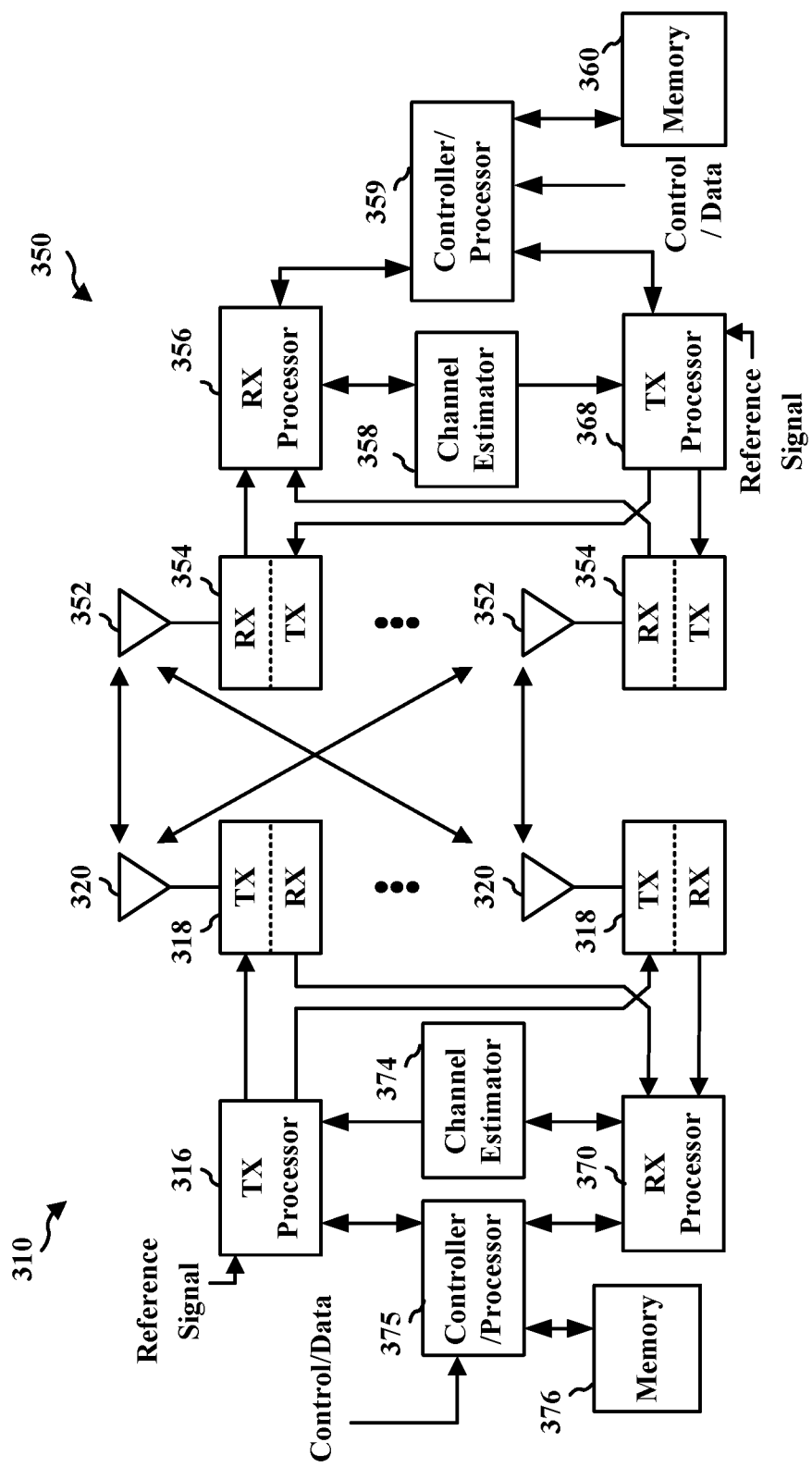
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

After establishing an RRC connection with a base station, a UE may enter an RRC inactive state in which the UE remains CM-CONNECTED and can move within an area configured by the RAN, e.g., an NG-RAN (RAN-based Notification Area (RNA), without notifying the RAN. In the RRC inactive mode, the UE context is maintained both at the UE and at the last serving base station. For example, the last serving base station may store the UE context including the UE-associated NG connection with the serving AMF and UPF. In contrast to the connected mode, the UE does not need to monitor physical data channels and may instead send channel feedback and perform mobility similar to an idle mode without informing the network. The UE may provide RAN area updates (RAUs).

For example, when the UE moves to a different base station, e.g., which may be referred to as the serving base station, in inactive mode, the UE can provide an RAU. The RAU may be based on expiration of periodic RAN update timer. The current base station, e.g., serving base station, receiving the RAU, can indicate for the UE to stay in the RRC inactive mode or to transition to an RRC idle mode.

If the last serving base station receives downlink data from the UPF or DL signaling from the AMF (except the UE Release Command and Reset messages) while the UE is in the RRC inactive mode, the base station may page the cells corresponding to the RNA and may send paging information, e.g., XnAP RAN Paging, to neighbor base station(s) if the RNA includes cells of neighbor base station(s).

If the last serving base station receives a UE Release Command message from the AMF while the UE is in the RRC inactive mode, it may reply with the UE Context Release Complete message. The AMF provides to the base station, the RRC Inactive Assistant Information to assist the base station's decision whether the UE can be sent to the RRC inactive mode. The RRC Inactive Assistant Information includes, e.g., the registration area configured for the UE, the UE specific DRX, Periodic Registration Update timer, an indication if the UE is configured with Mobile Initiated Connection Only (MICO) mode by the AMF, and/or UE Identity Index value. The UE registration area may be taken into account by the base station when configuring the RAN-based notification area. The UE specific DRX and UE identity index value may be used by the NG-RAN node for RAN paging. The Periodic Registration Update timer may be taken into account by the NG-RAN node to configure Periodic RAN Notification Area Update timer.

At transition to the RRC inactive mode, the base station may configure the UE with a periodic RNA Update timer value. If the UE accesses a base station other than the last serving base station, the receiving base station may trigger the XnAP Retrieve UE Context procedure to get the UE context from the last serving base station and may also trigger a Data Forwarding procedure including tunnel information for potential recovery of data from the last serving base station. Upon successful UE context retrieval, the receiving base station performs the slice-aware admission control in case of receiving slice information and becomes the serving base station and it further triggers the NGAP Path Switch Request procedure. After the path switch procedure, the serving base station triggers release of the UE context at the last serving base station by means of the XnAP UE Context Release procedure.

If the UE is not reachable at the last serving base station, the base station may fail AMF initiated UE-associated class 1 procedures if any, and trigger the NAS Non Delivery Indication procedure to report the non-delivery of any NAS PDUs received from the AMF for the UE.

If the UE accesses a base station other than the last serving base station, and the receiving base station does not find a valid UE Context, the base station establishes a new RRC connection instead of resumption of the previous RRC connection.

A UE in the RRC inactive state may initiate an RNA update procedure when the UE moves out of the configured RNA. When receiving RNA update request from the UE, the receiving base station may trigger the XnAP Retrieve UE Context procedure to obtain the UE context from the last serving base station. The receiving base station may decide to send the UE back to RRC inactive state, move the UE into RRC connected state, or send the UE to an RRC idle state.

A UE in the RRC inactive mode may perform cell reselection, simile to an RRC idle state. A UE in the RRC inactive state can be configured by the last serving NG-RAN node with an RNA. The RNA can cover a single or multiple cells, and may be contained within the CN registration area; in this release Xn connectivity should be available within the RNA. A RAN-based notification area update (RNAU) can be periodically sent by the UE and is also sent when the cell reselection procedure of the UE selects a cell that does not belong to the configured RNA. The RNA may be configured in a list of cells, a list of RAN areas, etc.

In order to transition from RRC inactive mode to an RRC connected mode, the UE may provide an I-RNTI allocated by the last serving base station, along with an RRC connection resume request. The base station, if able to resolve the last serving base station identity contained in the I-RNTI, requests the last serving base station to provide the UE context data. The last serving base station provides the UE context to the new base station. The new base station then completes the resumption of the RRC connection, e.g., in an RRC connection resume message. The new base station may perform path switch and trigger a release of the UE resources at the last serving base station. Signaling bearer SRB0 may be used without security, whereas signaling bearer SRB1 may include at least integrity protection.

Downlink data or downlink signaling from the network may trigger a paging event. Once triggered, paging may be triggered in cells controlled by the last serving base station or may also be triggered in cells controlled by other base stations, e.g., configured for the UE in the RNA. The UE may be paged with an RNTI, e.g., the I-RNTI.

Small-data-transmission (SDT) may allow transmission of data without leaving the Inactive mode. Otherwise, the UE may transition to an RRC connected mode to receive and transmit data. Such an early data transmission may be called EDT (Early Data Transmission), e.g., and may be used for eMTC and NB-IoT, as well as for other communication. Small data may be transmitted via NAS, e.g., as part of cellular Internet of Things (CIoT). As presented herein, small data transmissions may be provided for downlink data, even though the UE is not monitoring for data channels. Aspects for the small data transmission for UEs in RRC inactive mode may be applied, e.g., for 5G NR, eLTE, etc. Aspects presented herein enable a downlink data PDU to be provided to the UE without requiring the UE to move to an RRC connected mode.

Figure 4:
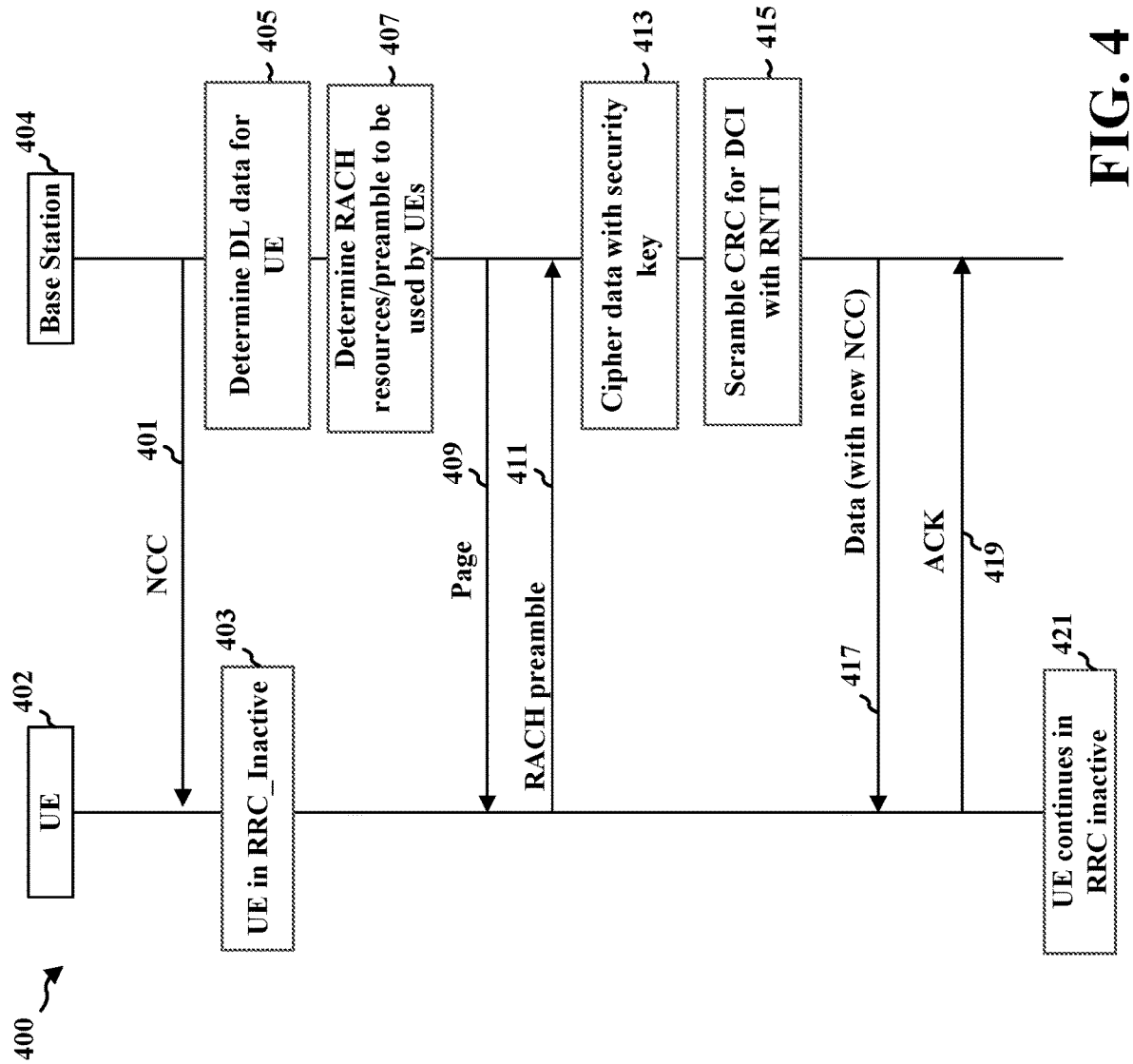
FIG. 4 illustrates an example communication flow between a base station and UE.

FIG. 4 illustrates an example communication flow 400 between a UE 402 and base station 404 that includes aspects presented herein. The UE may have entered an RRC inactive mode at 403. When data arrives to the base station for an inactive UE, e.g., at 405, the base station may page the UE at 409. The UE may respond to the page 405 by sending a first RACH preamble (e.g., a Msg1) 411. The Msg1 may comprise a preamble and/or additional signaling that indicates the downlink data is to be received without transitioning to the RRC connected mode. Instead of beginning a RACH procedure to establish an RRC connection with the base station, the page may provide information to the UE that informs the UE to receive the small data transmission without transitioning to the RRC connected mode, e.g., while remaining in the RRC idle mode.

In order to send the data, the base station may identify the UE based on the RACH preamble, e.g., Msg1. In order to identify the UE, the base station may signal a reserved preamble to the UE. The base station may signal the preamble to the UE, e.g., in the paging message 409. Then, the UE may use the indicated preamble at 411. The base station may select the preamble from a set of preambles. The preambles may be partitioned into preambles for small data transmission and preambles for data transmission in an RRC connected mode. Thus, the base station may select from among preambles reserved for small data transmission in RRC inactive mode. If a second UE selects the same preamble at the same RACH occasion, the second UE will not receive a RAR in Msg2 (e.g., a second random access message). RACH will fail for the second UE, and the second UE will repeat its RACH procedure.

The base station may also signal RACH resources in time and/or frequency to be used by the UE for the preamble. The RACH resources may be signaled to the UE in the page 409. Similar to the preamble, the RACH resources may be selected from RACH resources reserved for small data transmission. The page may indicate to the UE that the downlink data will be transmitted to the UE without establishing an RRC connection. This indication may be separate from the preamble and RACH resources or may be indicated through the selection or the preamble and/or RACH resources. Thus, at 407, the base station 404 may select or otherwise determine RACH resources and/or a preamble to be indicated to the UE in the page 409.

Once the base station receives the preamble 411 and identifies the UE, the base station may schedule the data on PDSCH and may send the data in Msg2 at 417. The UE may acknowledge successful receipt of the downlink data at 419. Then, the UE may continue in the RRC inactive mode at 421. The C-RNTI for the data transmission can be the C-RNTI which is kept in the UE context or may comprise a new RNTI that is provided to the UE. For example, the DCI for the downlink data transmission may comprise a CRC scrambled with the C-RNTI, or the new RNTI for the UE, at 415. The new RNTI may be indicated to the UE or may comprise a specified RNTI. The data can be transmitted on a signaling bearer, e.g., SRB1 or a default bearer, e.g., DRB. For example, the data may be transmitted on a signaling bearer or default bearer that is specified for small data transmissions, and/or that is otherwise indicated to the UE for the small data transmission 417.

When the UE moves to an RRC inactive mode, it may be provided with an NCC 401, e.g., in a Release message from the anchor base station. The data transmitted from the base station at 417 may be ciphered, at 415, with a key derived using this NCC. The base station may also provide a new NCC along with the data in the Msg2 417 to be used for a next transmission, a regular resume, an RNAU, etc. The new NCC can be sent as a MAC CE or in a Release message, e.g., if one is used for the data transmission 417.

Figure 5:
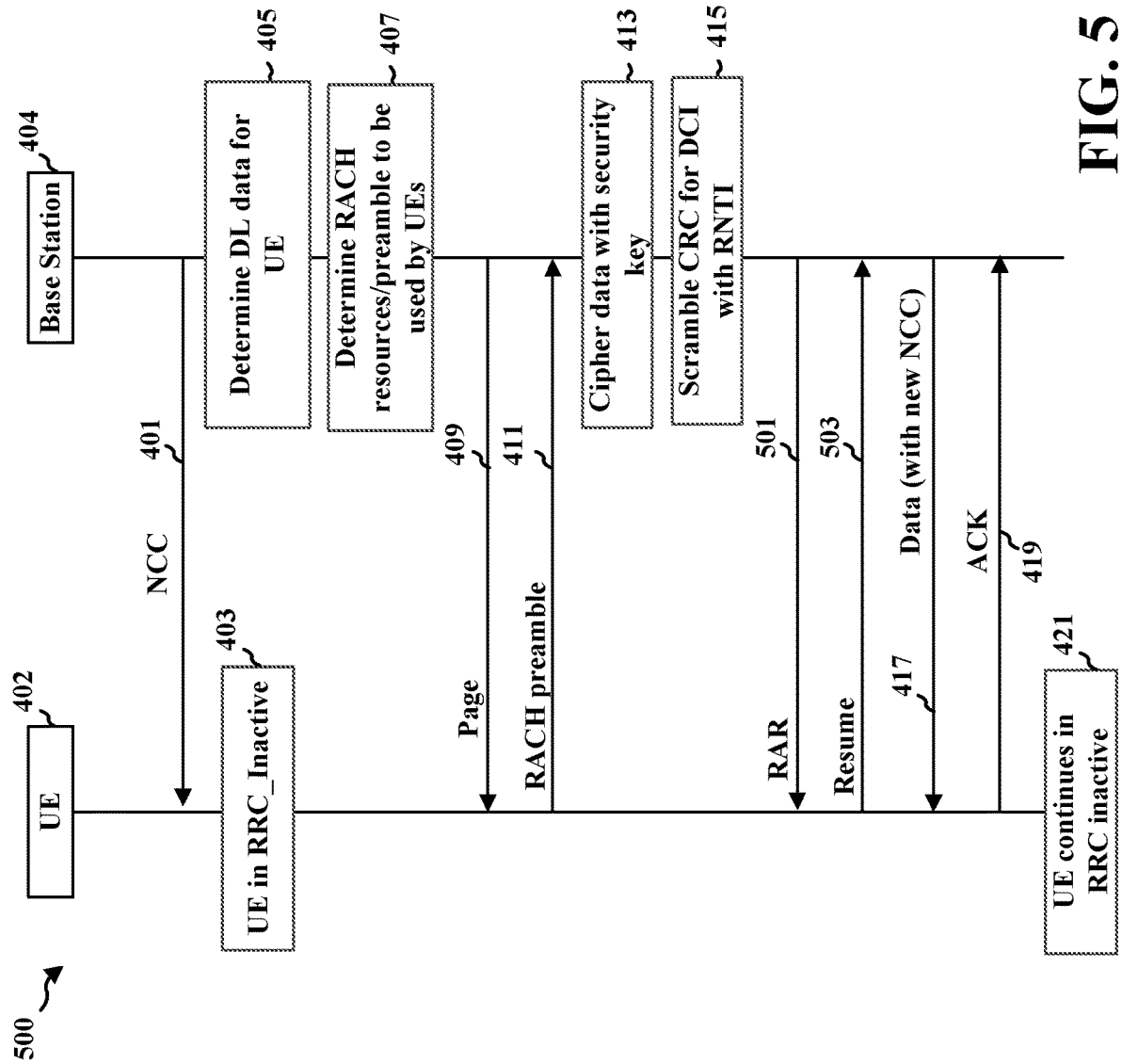
FIG. 5 illustrates an example communication flow between a base station and UE.

As an alternative to data transmission on Msg2, the data may also be transmitted to the UE in Msg4. FIG. 5 illustrates an example communication flow 500 in which the downlink data is transmitted to a UE in RRC inactive mode in Msg4. The same reference numbers for aspects already described in connection with FIG. 4 are repeated in FIG. 5. In FIG. 5, the base station may transmit a random access response (RAR) 501 in Msg2 rather than transmitting the data. The UE may respond with a resume message 503, e.g. Msg3. Then, the base station may transmit the data 417 in Msg4. Similar to the example in FIG. 4, the base station may indicate the preamble to be used by the UE in the page 409. As the base station has the additional messages, e.g., messages 501, 503 to identify the UE, the base station might not indicate the preamble to the UE in the page. In the resume message 503, the UE may indicate that the resume message is for the reception of downlink data in RRC inactive mode without transitioning to a connected mode. If the UE sends the resume message 503 to the anchor base station, the base station may match the I-RNTI sent in the RAR 501, e.g., Msg3 that was sent to the UE. If the UE resumes at a new serving base station, a new establishment cause may be indicated in the resume message 503 to indicate to the base station that it is a special resume. The UE may need to get this information, e.g., the new establishment cause, I-RNTI, etc. from the page message 409 and/or the RAR 501. The data message 417 may then be sent in Msg4. The data message 417 may comprise a release message that indicates for the UE to continue in the RRC inactive mode. When the UE received the data message 417, e.g., including the release message, the UE processes the data and continues in the RRC inactive mode. The UE may provide an acknowledgement of successful receipt 419 to the base station.

Figure 6:
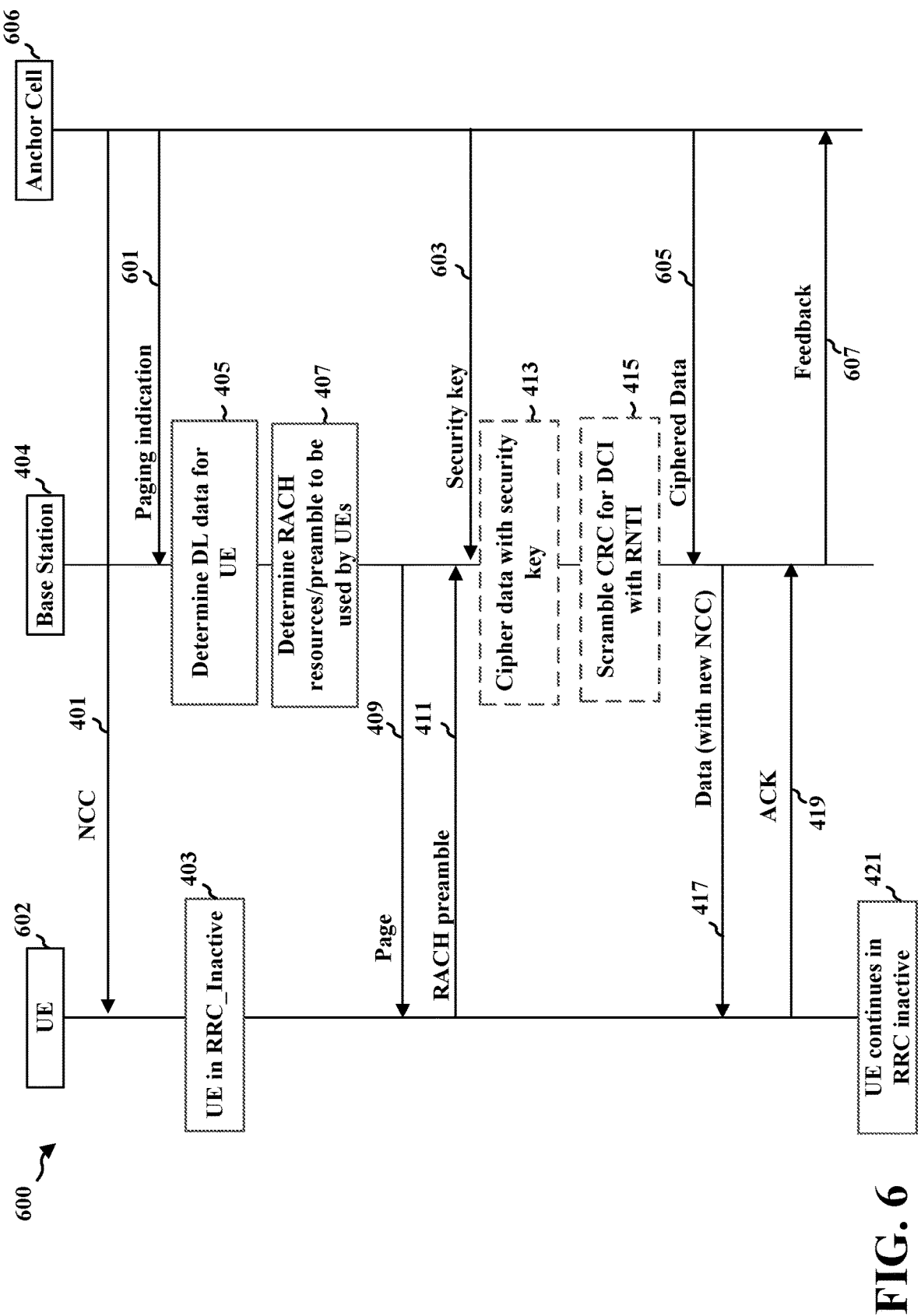
FIG. 6 illustrates an example communication flow between a base station and UE.

The downlink data transmission 417 may also be accomplished if the UE has moved to another serving cell. FIG. 6 illustrates and example communication flow 600 in which the base station that pages the UE is a new serving cell. Thus, in FIG. 6, base station 404 may be a current serving base station that receives information from anchor cell 606. The anchor cell may store the UE context for the UE 402. In order for a UE to receive downlink data while in an RRC inactive state, the UE may need to be paged by multiple cells, because the UE may have moved out of coverage of the last serving cell. The anchor cell 606 may send a paging indication 601 to multiple cells, e.g., over Xn. Thus, each cell paging the UE may need to select a preamble for the small data transmission. The cells may include an indication of the preamble in the paging message 409 after receiving the paging indication 601 from the anchor base station. In addition, the anchor base station 606 may provide a C-RNTI and/or security key information 603, in addition to providing the data packet. As one example, the anchor base station 606 send the complete UE context to each paging base station 404. This may enable the paging base stations to cipher the data packet before transmitting the data to the UE. As another better option, the anchor base station can cipher the data packet before providing it to the paging cells. The anchor base station may send the ciphered data packet 605 to the paging base station 404, e.g., along with the C-RNTI. The C-RNTI may be used to scramble CRC for DCI in connection with the data transmission 417.

While the example in FIG. 6 illustrates data transmission without a RAR 501 and resume message 503, similar aspects apply to the example in FIG. 5. An anchor base station may provide the data packet, RNTI information, and security information (whether the UE context, the security key, or a ciphered data packet) to the paging base station 404 in a manner that enables the base station to transmit the data in Msg4 following a resume message 503.

The base station may determine, at times, to fallback to move the UE to an RRC connected mode for any reason. The UE may accomplish such fallback by sending a regular random access response 501 or by sending an indication to establish the RRC connection in the response. As well, the base station may indicate a fallback to an RRC connected mode by sending an connection setup message in Msg4, e.g., following the resume message 503 from the UE. If the UE receives an indication to perform regular RRC connection in order to receive the data, whether by receiving a regular Msg2 and/or a connection setup message in Msg4, the UE may move forward with a normal resume procedure to establish an RRC connection. Such fallback may be initiated by the base station even when the initial page indicates the small data transmission.

Figure 7:
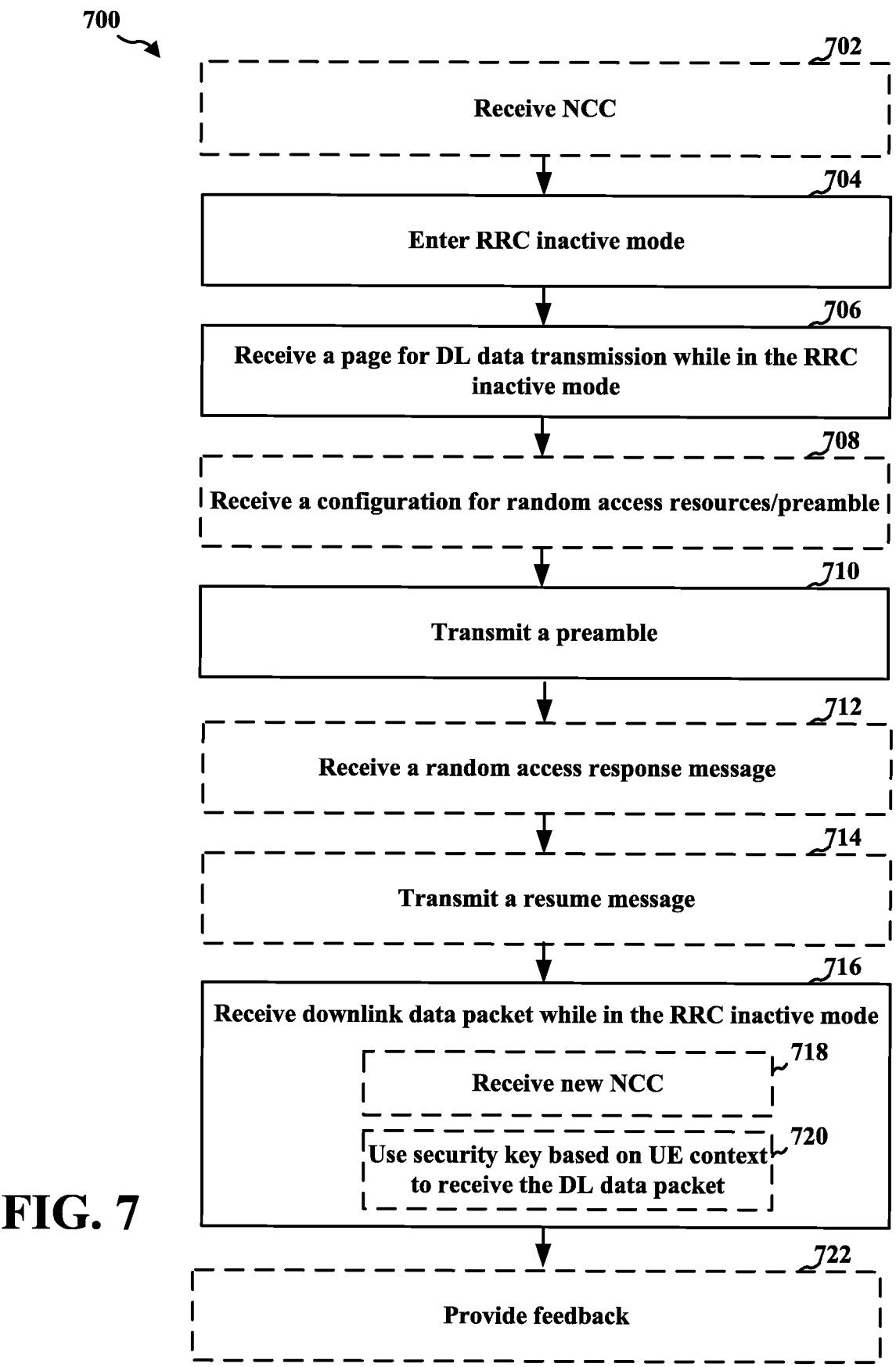
FIG. 7 is a flowchart of a method of wireless communication.

FIG. 7 is a flowchart 700 of a method of wireless communication. The method may be performed by a UE or a component of a UE (e.g., UE 104, 350, 402, 1150, the apparatus 802/802' the processing system 914, which may include the memory 360 and which may be the entire UE 350 or a component of the UE 350, such as the TX processor 368, the RX processor 356, and/or the controller/processor 359). Optional aspects are illustrated with a dashed line. The method may help to improve efficient communication of data between a UE and a base station.

At 704, the UE enters an RRC inactive mode. Entering the RRC inactive mode may be performed, e.g., by RRC mode component 808 of apparatus 802. In the inactive mode, the UE is in a state where the UE remains connected with an anchor cell and can move within an area without notifying the RAN. The last serving node keeps the UE context and the UE associated connection, e.g., with a serving AMF and UPF.

At 706, the UE receives a page from a base station for a downlink data transmission while in the RRC inactive mode. The page may be received, e.g., by page component 810 and/or reception component 804 of apparatus 802. The page message received at 706 may provide information guiding the UE in random access for a small downlink data.

For example, at 708, the UE may receive, or otherwise determine, a configuration for random access resources and/or the random access preamble in the page from the base station. The configuration may be received, or determined, e.g., by configuration component 816 of apparatus 802. The page message may include an indication for the data transmission without establishing an RRC connection. Such an indication may be sent along with the preamble and resource information or may be provided independent from an indication of a RACH preamble or RACH resources.

At 710, the UE transmits a random access preamble to the base station in response to the page. The random access preamble may be transmitted, e.g., by preamble component 812 and/or transmission component 806 of apparatus 802.

At 716, the UE receives a downlink data packet from the base station while remaining in the RRC inactive mode. The downlink data packet may be received, e.g., by reception component 804 and/or data component 814 of apparatus 802. The downlink data packet may be received without the UE transitioning to an RRC connected mode. The downlink data packet may be received over a signaling bearer, e.g., SRB 1. In other examples, the downlink data packet may be received over a default data bearer, e.g., DRB.

The downlink data may be received in a message following the preamble, e.g., the downlink data may be received in Msg2 in response to Msg1 received from the UE. The Msg1 may comprise a preamble and/or an additional signal indicating a downlink data transmission without establishing an RRC connection. In other examples, the downlink data may be received in a Msg4 from the base station. In this example, the UE may receive, at 712, a random access response message from the base station in response to the preamble, and may transmit, at 714, a resume message to the base station prior to receiving the downlink data packet at 716. The resume message may be transmitted, e.g., by resume component 820 of apparatus 802. The resume message may comprise an indication that the UE will receive data while remaining in the RRC inactive mode. Similarly, the page, received by the UE at 706, may comprise an indication that the UE will receive data while remaining in the RRC inactive mode.

The downlink data packet may be ciphered by the base station using a security key based on a UE context stored at the base station. Thus, as a part of receiving the downlink data packet, at 716, the UE may use the security key based on the UE context stored at the UE, at 718. The use of a security key may be performed, e.g., by security component 822. The UE may receive an NCC, at 702, in connection with entering the RRC inactive mode, and the security key used at 718, may be derived by the UE using the NCC. The NCC may be received, e.g., by reception component 804 and/or NCC component 824. The UE may receive, at 720, a new NCC in a message with the downlink data packet. As well, when the data is transmitted in Msg2, in response to the preamble, a CRC for DCI associated with the downlink data packet may be scrambled using an RNTI for the UE. The RNTI may comprise, e.g., a C-RNTI from a stored UE context, a new RNTI indicated to the UE in the page, or a specified RNTI, etc.

In some circumstances, the base station may determine that a fallback to an RRC connected mode in needed in order to provide the data to the UE. The base station, in the random access response message received at 712, may indicate for the UE to fallback to establish an RRC connection in order to receive the downlink data. The base station may send such a fallback indication, even after transmitting a page indicating for the UE to receive the data in the inactive mode.

As well, the UE may acknowledge receipt of the downlink data, at 722, or provide other feedback to enable the base station to determine whether the UE successfully received the data. The feedback may be provided, e.g., by data component 814 and/or transmission component 806 of apparatus.

Figure 8:
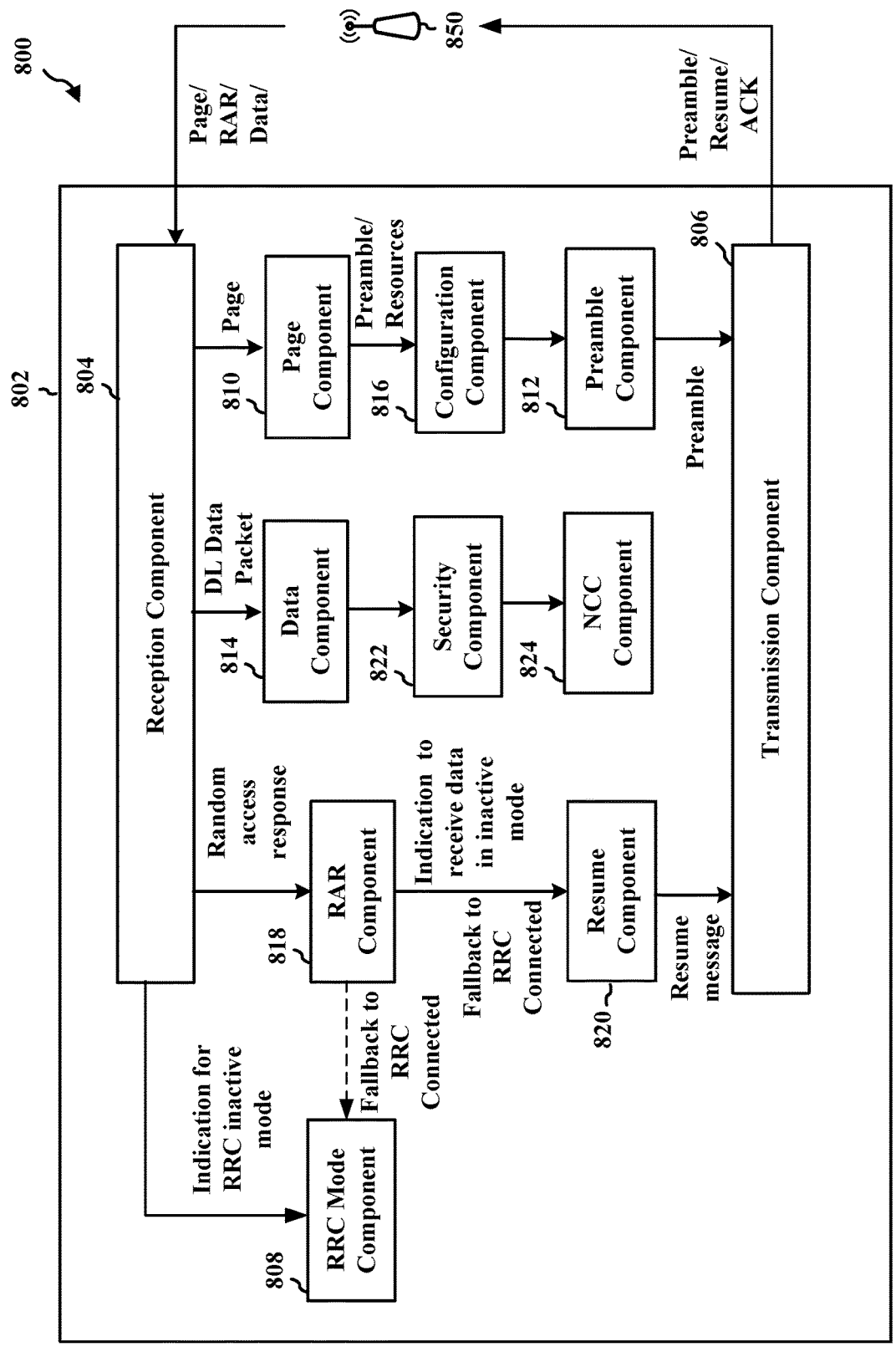
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE or a component of a UE (e.g., UE 104, 350, 402, 1150). The apparatus includes a reception component 804 that receives downlink communication from a base station 850 and a transmission component that transmits uplink communication to the base station 850.

The apparatus includes an RRC mode component 808 configured to cause the apparatus to enter a RRC inactive mode, e.g., as described in connection with 704 in FIG. 7. The apparatus includes a page component 810 configured to receive a page from a base station 850 for a downlink data transmission while in the RRC inactive mode, e.g., as described in connection with 706 in FIG. 7. The apparatus includes a preamble component 812 configured to transmit a random access preamble to the base station in response to the page, e.g., as described in connection with 710 in FIG. 7. The apparatus includes a data component 814 configured to receive a downlink data packet from the base station while remaining in the RRC inactive mode, e.g., as described in connection with 716 in FIG. 7.

The apparatus may further include a configuration component 816 configured to receive a configuration for random access resources and the random access preamble in the page from the base station, e.g., as described in connection with 708 in FIG. 7. The apparatus may include a RAR component 818 configured to receive a random access response message from the base station, e.g., as described in connection with 712 in FIG. 7. The response may indicate to the UE to receive the data in the inactive mode without establishing an RRC connection. In other examples, the base station may determine a need to fallback to an RRC mode for transmitting the data. In this example, the response may indicate for the UE to fallback to an RRC connected mode. The apparatus may include a resume component 820 configured to transmit a resume message to the base station prior to receiving the downlink data packet, e.g., as described in connection with 714 in FIG. 7. The apparatus may further include a security component 822 configured to use a security key based on the UE context stored at the UE to receive the downlink data packet, e.g., as described in connection with 720 in FIG. 7. The apparatus may include an NCC component 824 configured to receive an NCC in connection with entering the RRC inactive mode, wherein the security key is derived using the NCC, e.g., as described in connection with 702, 718 in FIG. 7.

The apparatus may include additional components that perform each of the blocks of the algorithm in the aforementioned flowcharts of FIGS. 4-7. As such, each block in the aforementioned flowcharts of FIGS. 4-7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
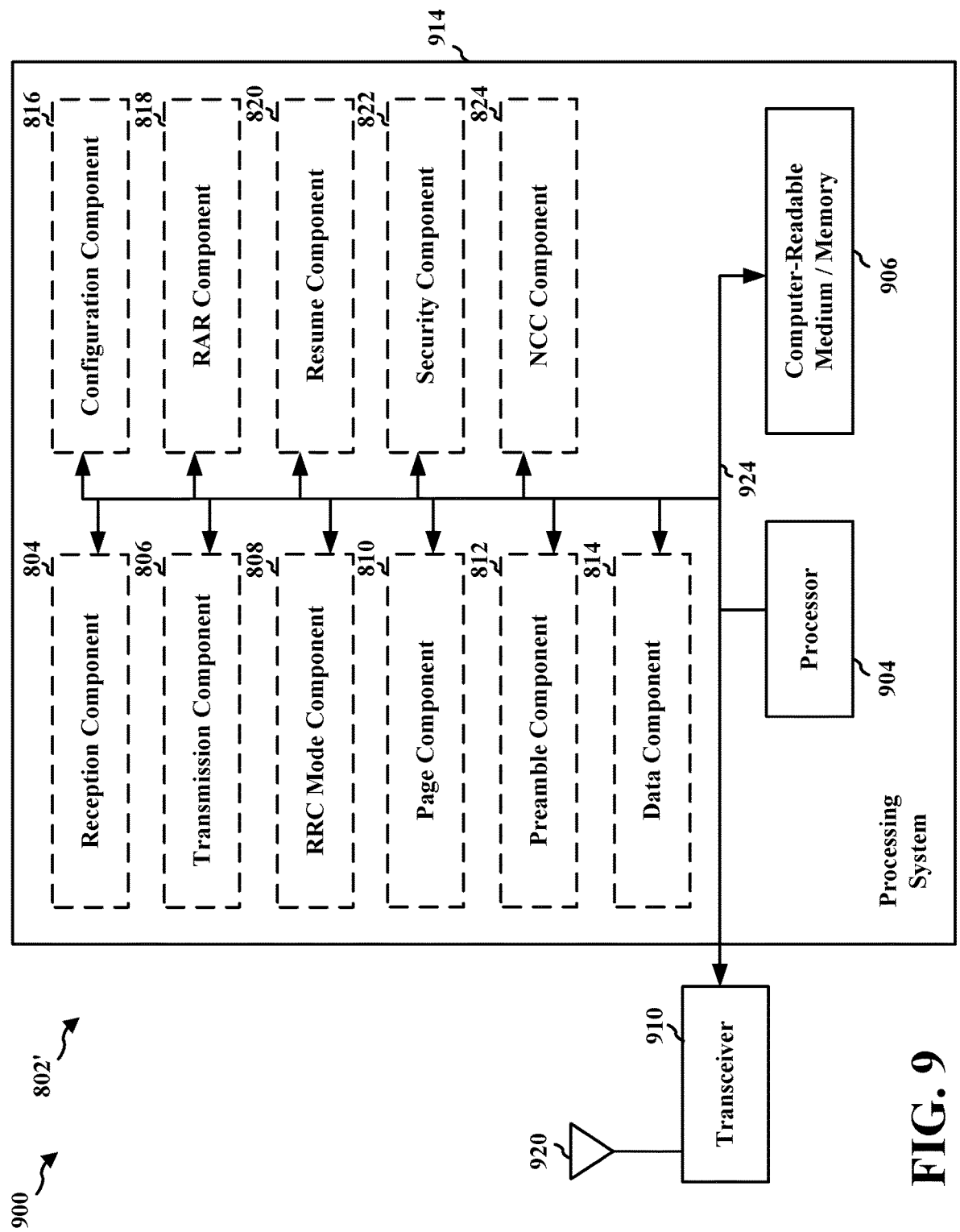
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, 820, 822, 824, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818, 820, 822, 824. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may comprise the entire UE, e.g., UE 350.

In one configuration, the apparatus 802/802' for wireless communication includes means for entering a RRC inactive mode; means for receiving a page from a base station for a downlink data transmission while in the RRC inactive mode; means for transmitting a random access preamble to the base station in response to the page; means for receiving a downlink data packet from the base station while remaining in the RRC inactive mode; means for receiving a configuration for random access resources and the random access preamble in the page from the base station; means for receiving a random access response message from the base station; means for transmitting a resume message to the base station prior to receiving the downlink data packet; means for using the security key based on the UE context stored at the UE to receive the downlink data packet; means for receiving a Next hop Chaining Counter (NCC) in connection with entering the RRC inactive mode, wherein the security key is derived using the NCC. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
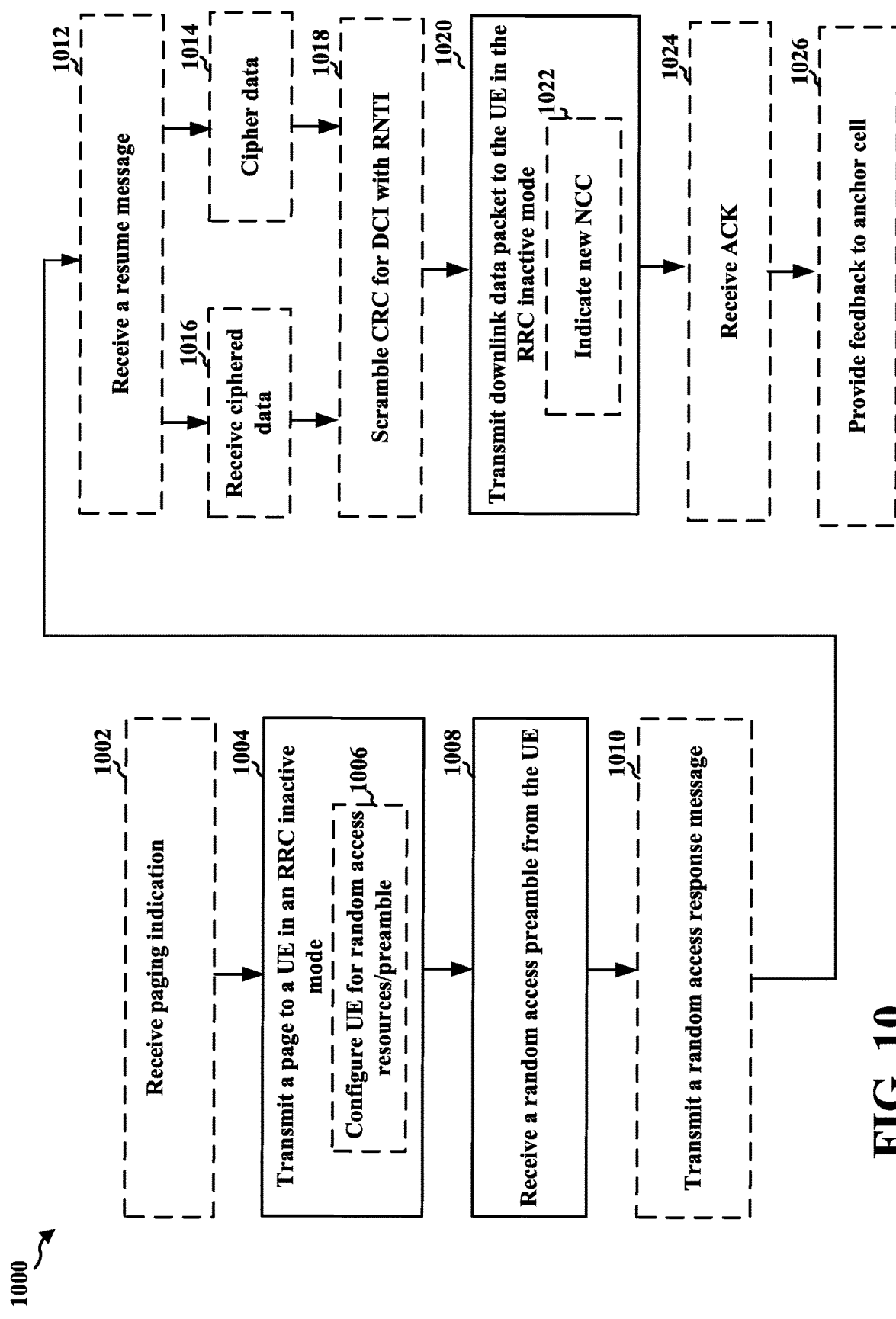
FIG. 10 is a flowchart of a method of wireless communication.

FIG. 10 is a flowchart 1000 of a method of wireless communication. The method may be performed by a base station or a component of a base station (e.g., base station 102, 180, 310, 404, 606, 850, the apparatus 1102, 1102' the processing system 1214, which may include the memory 376 and which may be the entire base station 310 or a component of the base station 310, such as the TX processor 316, the RX processor 370, and/or the controller/processor 375). Optional aspects are illustrated with a dashed line. The method may help to enable efficient data transmissions between a UE and base station.

At 1004, the base station transmits a page to the UE in an RRC in an inactive mode for a downlink data transmission. The page may be transmitted, e.g., by page component 1108 and/or transmission component 1106 of apparatus 1002. The page may provide information to the UE for random access with the base station. For example, the base station may transmit a configuration for random access resources and/or the random access preamble in the page to the UE. The page may comprise an indication that the UE should receive data while remaining in the RRC inactive mode.

At 1008, the UE receives a random access preamble from the UE in response to the page transmitted at 1004. The random access preamble may be received, e.g., by reception component 1104 and/or preamble component 1110 of apparatus 1102. The preamble may be based on information indicated to the UE in the page.

At 1020, the base station transmits a downlink data packet to the UE while the UE remains in the RRC inactive mode. The downlink data packet may be transmitted, e.g., by data component 1112 and/or transmission component 1106 of apparatus 1002. The downlink data packet may be transmitted without transitioning the UE to an RRC connected mode. The downlink data packet may be transmitted over a signal bearer, e.g., SRB1. The downlink data packet may be transmitted over a default bearer, e.g., DRB.

The downlink data packet may be transmitted in response to the random access preamble, e.g., in Msg2. In another example, the downlink data may be transmitted in Msg4. In this example, the base station may transmit, at 1010, a random access response message to the UE in response to receiving the random access preamble. The random access response message may be transmitted by RAR component 1116 and/or transmission component 1106 of apparatus 1102. The base station may receive, at 1012, a resume message from the UE prior to transmitting the downlink data packet. The resume message may be received, e.g., by reception component 1104 and/or resume component 1118 of apparatus 1102. The resume message may comprise an indication that the UE will receive data while remaining in the RRC inactive mode.

The base station may cipher, at 1014, the downlink data packet using a security key based on a UE context stored at the base station. The ciphering may be performed, e.g., by cipher component 1120 of apparatus 1102. The security key may be derived using an NCC that was provided to the UE in connection with the UE entering the RRC inactive mode. The base station may indicate, at 1022, a new NCC to the UE in a message with the downlink data packet. The NCC may be derived and/or indicated by NCC component 1122 of apparatus 1102.

At 1018, when the data is transmitted in a Msg2 in response to receiving the preamble, the base station may also scramble a CRC for DCI associated with the downlink data packet using an RNTI for the UE, wherein the RNTI comprises a C-RNTI from a stored UE context or a new RNTI indicated to the UE in the page. The scrambling may be performed, e.g., by scramble component 1124 of apparatus 1102.

The base station may be an anchor cell. The anchor cell is the cell that was last connected to the UE, e.g., in an RRC connected state. The anchor cell stores the UE context. Thus, if the base station is the anchor cell, the base station will have the UE context and will be able to derive the security key and will have the RNTI information. However, the UE may have moved to coverage by a different base station. Thus, the base station that transmits the data might not be the anchor base station. In this example, the base station may receive from the anchor cell, at 1002, a paging indication to page the UE, wherein the base station determines the random access preamble and random access resources to configure for the UE. The paging indication may be received, e.g., by paging indication component 1126 of apparatus 1102.

The base station may receive an un-ciphered downlink data packet from the anchor cell. The paging indication, received at 1002, from the anchor cell may comprise a C-RNTI from a stored UE context and a security key based on the stored UE context. Then, the base station may cipher the downlink data packet, at 1014, using the security key received from the anchor cell. In another example, the UE may receive, at 1016, the downlink data packet from the anchor cell prior to transmission of the downlink data packet to the UE, wherein the downlink data packet is ciphered using a security key from the stored UE context.

The base station may receive, from the UE, an acknowledgement of a successful reception of the downlink data packet, at 1024. If the UE is not the anchor cell, the UE may transmit, to the anchor cell, an indication of the successful reception of the downlink data packet by the UE, at 1026. The acknowledgement may be received, e.g., by reception component 1104 and/or data component 1112. The acknowledgement may be transmitted, e.g., by transmission component 1106 and/or data component 1112.

In some circumstances, the base station may determine that a fallback to an RRC connected mode in needed in order to provide the data to the UE. The base station, in the random access response message transmitted at 1010, may indicate for the UE to fallback to establish an RRC connection in order to receive the downlink data. The base station may send such a fallback indication, even after transmitting a page indicating for the UE to receive the data in the inactive mode.

Figure 11:
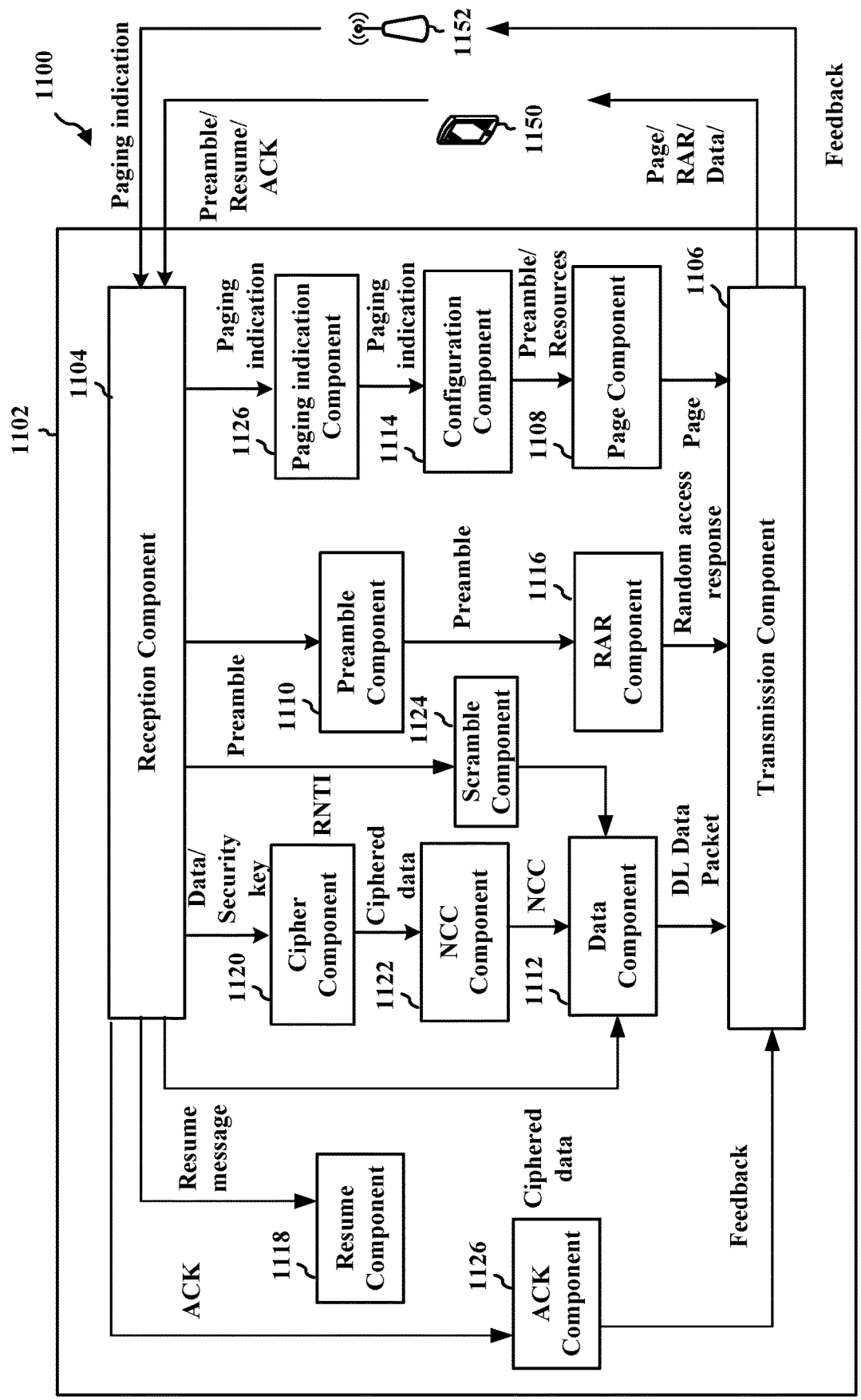
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a base station or a component of a base station (e.g., base station 102, 180, 310, 404, 606, 850). The apparatus includes a reception component 1104 that receives communication from UE 1150 and/or anchor cell 1152 and a transmission component 1106 that transmits communication to UE 1150 and/or anchor cell 1152.

The apparatus may include a page component 1108 configured to transmit a page to a UE in an RRC inactive mode for a downlink data transmission, e.g., as described in connection with 1004 of FIG. 10. The apparatus includes a preamble component 1110 configured to receive a random access preamble from the UE in response to the page, e.g., as described in connection with 1008 of FIG. 10. The apparatus may include a data component 1112 configured to transmit a downlink data packet to the UE while the UE remains in the RRC inactive mode, e.g., as described in connection with 1020 of FIG. 10. The apparatus may include a configuration component 1114 configured to provide a configuration for random access resources and the random access preamble in the page to the UE, e.g., as described in connection with 1006 of FIG. 10. The apparatus may include an RAR component 1116 configured to transmit a random access response message to the UE in response to receiving the random access preamble, e.g., as described in connection with 1010 of FIG. 10. The apparatus may include a resume component 1118 configured to receive a resume message from the UE prior to transmitting the downlink data packet, e.g., as described in connection with 1012 of FIG. 10. The apparatus may include a cipher component 1120 configured to cipher the downlink data packet using a security key based on a UE context stored at the base station or received from an anchor base station, e.g., as described in connection with 1014 of FIG. 10. The apparatus may include an NCC component 1122 configured to indicate a new NCC to the UE in a message with the downlink data packet, e.g., as described in connection with 1022 of FIG. 10. The apparatus may include a scramble component 1124 configured to scramble a CRC for DCI associated with the downlink data packet using a RNTI for the UE, e.g., as described in connection with 1018 of FIG. 10. The apparatus may include a paging indication component 1126 configured to receive, from an anchor cell, a paging indication to page the UE, e.g., as described in connection with 1002 of FIG. 10. The data component may receive the downlink data packet from the anchor cell prior to transmission of the downlink data packet to the UE. The downlink data may be ciphered by the anchor cell or the anchor cell may provide a security key to the base station to perform the ciphering. The apparatus may include an ACK component configured to receive, from the UE, an acknowledgement of a successful reception of the downlink data packet and to transmit, to the anchor cell, an indication of the successful reception of the downlink data packet by the UE, e.g., as described in connection with 1024, 1026 of FIG. 10.

The apparatus may include additional components that perform each of the blocks of the algorithm in the aforementioned flowcharts of FIGS. 4-6 and 10. As such, each block in the aforementioned flowcharts of FIGS. 4-6 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
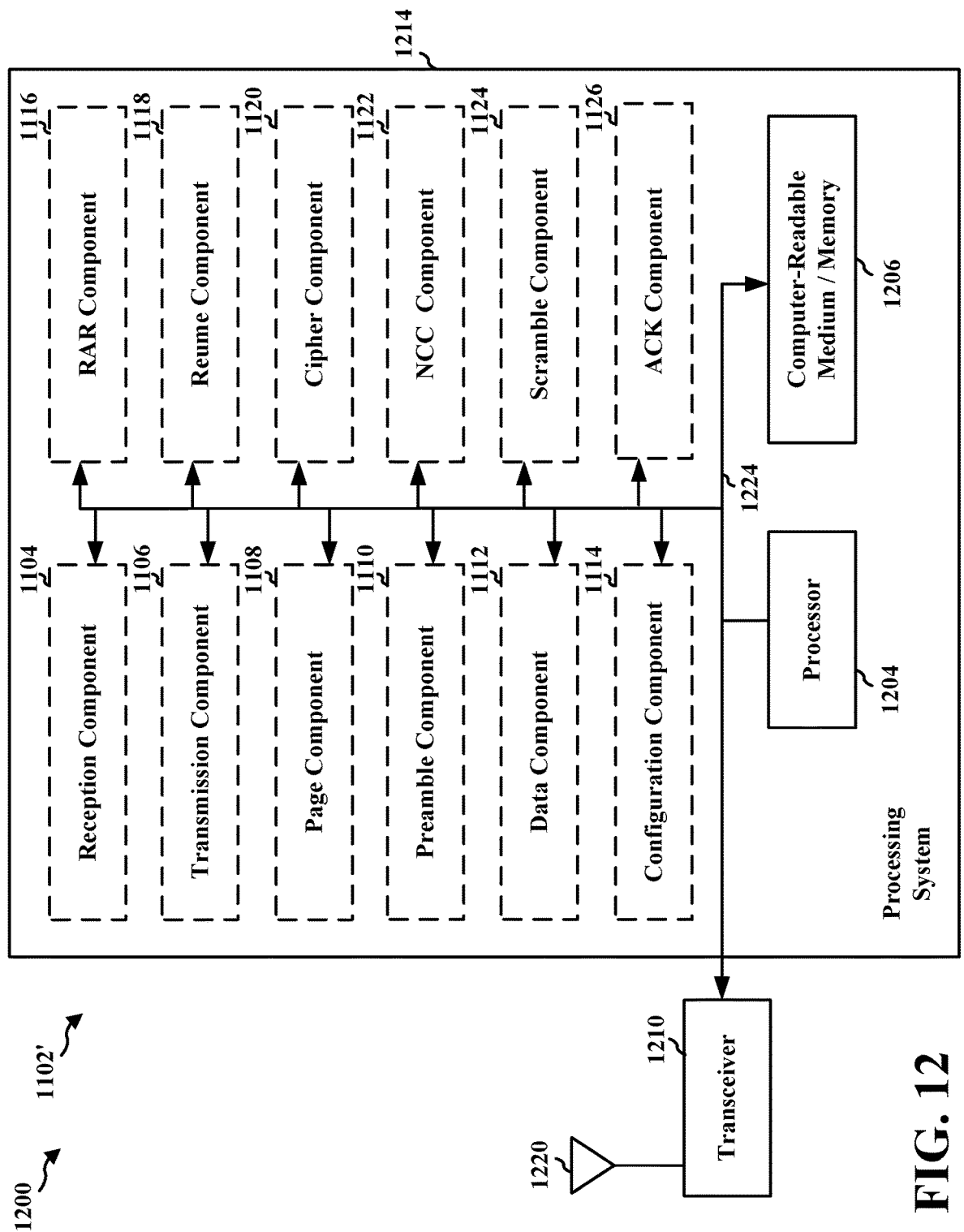
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, 1122, 1124, 1126, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120, 1122, 1124, 1126. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system may comprise the entire base station, e.g., base station 310.

In one configuration, the apparatus 1102/1102' for wireless communication includes means for transmitting a page to a UE in an RRC inactive mode for a downlink data transmission, means for receiving a random access preamble from the UE in response to the page, means for transmitting a downlink data packet to the UE while the UE remains in the RRC inactive mode, means for transmitting a configuration for random access resources and the random access preamble in the page to the UE, means for transmitting a random access response message to the UE in response to receiving the random access preamble, means for receiving a resume message from the UE prior to transmitting the downlink data packet, means for ciphering the downlink data packet using a security key based on a UE context stored at the base station, means for indicating a new NCC to the UE in a message with the downlink data packet, means for scrambling a CRC for DCI associated with the downlink data packet using a RNTI for the UE, wherein the RNTI comprises a C-RNTI from a stored UE context or a new RNTI indicated to the UE in the page, means for receiving, from an anchor cell, a paging indication to page the UE, wherein the base station determines the random access preamble and random access resources to configure for the UE, means for receiving the downlink data packet from the anchor cell prior to transmission of the downlink data packet to the UE, wherein the downlink data packet is ciphered using a security key from the stored UE context, means for receiving, from the UE, an acknowledgement of a successful reception of the downlink data packet, means for transmitting, to the anchor cell, an indication of the successful reception of the downlink data packet by the UE, and means for transmitting a response to the random access preamble received from the UE, the response indicating a fallback to establish an RRC connection in order to transmit the downlink data packet, wherein the downlink data packet is transmitted after the UE transitions to an RRC connected mode when the base station determines a need for the fallback to transmission in the RRC connected mode. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   entering a Radio Resource Control (RRC) inactive mode;
   receiving a page from a base station for a downlink data transmission while in the RRC inactive mode;
   transmitting a random access preamble to the base station in response to the page; and
   receiving a downlink user data packet, of the downlink data transmission indicated in the page, from the base station in response to the random access preamble from the UE or a random access response message while remaining in the RRC inactive mode and without transitioning to an RRC connected mode.

2. The method of claim 1, further comprising:
   receiving a configuration for random access resources and the random access preamble in the page from the base station.

3. The method of claim 1, wherein the downlink user data packet is received in response to the random access preamble transmitted to the base station.

4. The method of claim 1, further comprising:
   receiving the random access response message from the base station in response to the random access preamble; and
   transmitting a resume message to the base station prior to receiving the downlink user data packet, wherein the downlink user data packet is received in response to the resume message from the UE.

5. The method of claim 4, wherein the resume message comprises an indication that the UE will receive data while remaining in the RRC inactive mode.

6. The method of claim 4, wherein the page comprises an indication that the UE will receive data while remaining in the RRC inactive mode.

7. The method of claim 1, wherein the downlink user data packet is ciphered using a security key based on a UE context stored at the base station, the method further comprising:
   using the security key based on the UE context stored at the UE to receive the downlink user data packet.

8. The method of claim 7, further comprising:
   receiving a Next hop Chaining Counter (NCC) in connection with entering the RRC inactive mode, wherein the security key is derived using the NCC.

9. The method of claim 8, further comprising:
   receiving a new NCC in a message with the downlink user data packet.

10. The method of claim 1, wherein the downlink user data packet is received over a signaling bearer.

11. The method of claim 1, wherein the downlink user data packet is received over a default data bearer.

12. The method of claim 1, wherein a cyclic redundancy check (CRC) for downlink control information (DCI) associated with the downlink user data packet is scrambled using a Radio Network Temporary Identifier (RNTI) for the UE, wherein the RNTI comprises a Cell RNTI (C-RNTI) from a stored UE context, a new RNTI indicated to the UE in the page, or a specified RNTI.

13. An apparatus for wireless communication at a User Equipment (UE), comprising:
   means for entering a Radio Resource Control (RRC) inactive mode;
   means for receiving a page from a base station for a downlink data transmission while in the RRC inactive mode;
   means for transmitting a random access preamble to the base station in response to the page; and
   means for receiving a downlink user data packet, of the downlink data transmission indicated in the page, from the base station in response to the random access preamble from the UE or a random access response message while remaining in the RRC inactive mode and without transitioning to an RRC connected mode.

14. The apparatus of claim 13, further comprising:
   means for receiving a configuration for random access resources and the random access preamble in the page from the base station.

15. The apparatus of claim 13, further comprising:
   means for receiving the random access response message from the base station in response to the random access preamble; and
   means for transmitting a resume message to the base station prior to receiving the downlink user data packet.

16. The apparatus of claim 13, wherein the downlink user data packet is ciphered using a security key based on a UE context stored at the base station, the apparatus further comprising:

means for using the security key based on the UE context stored at the UE to receive the downlink user data packet.

17. The apparatus of claim 16, further comprising:
means for receiving a Next hop Chaining Counter (NCC) in connection with entering the RRC inactive mode, wherein the security key is derived using the NCC.

18. The apparatus of claim 17, wherein the means for receiving the NCC further receive a new NCC in a message with the downlink user data packet.

19. An apparatus for wireless communication at a User Equipment (UE), comprising:
memory; and
at least one processor coupled to the memory and configured to cause the UE to:
enter a Radio Resource Control (RRC) inactive mode;
receive a page from a base station for a downlink data transmission while in the RRC inactive mode;
transmit a random access preamble to the base station in response to the page; and
receive a downlink user data packet, of the downlink data transmission indicated in the page, from the base station in response to the random access preamble from the UE or a random access response message while remaining in the RRC inactive mode and without transitioning to an RRC connected mode.

20. The apparatus of claim 19, wherein the at least one processor is further configured to cause the UE to:
receive a configuration for random access resources and the random access preamble in the page from the base station.

21. The apparatus of claim 19, wherein the at least one processor is further configured to cause the UE to:
receive the random access response message from the base station in response to the random access preamble; and
transmit a resume message to the base station prior to receiving the downlink user data packet.

22. The apparatus of claim 19, wherein the downlink user data packet is ciphered using a security key based on a UE context stored at the base station, wherein the at least one processor is further configured to cause the UE to:
use the security key based on the UE context stored at the UE to receive the downlink user data packet.

23. The apparatus of claim 22, wherein the at least one processor is further configured to cause the UE to:
receive a Next hop Chaining Counter (NCC) in connection with entering the RRC inactive mode, wherein the security key is derived using the NCC.

24. The apparatus of claim 23, wherein the at least one processor is further configured to cause the UE to:
receive a new NCC in a message with the downlink user data packet.

25. A non-transitory computer-readable medium storing computer executable code for wireless communication at a User Equipment (UE), the code when executed by at least one processor causes the UE to:
enter a Radio Resource Control (RRC) inactive mode;
receive a page from a base station for a downlink data transmission while in the RRC inactive mode;
transmit a random access preamble to the base station in response to the page; and
receive a downlink user data packet, of the downlink data transmission indicated in the page, from the base station in response to the random access preamble from the UE or a random access response while remaining in the RRC inactive mode and without transitioning to an RRC connected mode.

26. A method of wireless communication at a base station, comprising:
transmitting a page to a User Equipment (UE) in a Radio Resource Control (RRC) inactive mode for a downlink data transmission;
receiving a random access preamble from the UE in response to the page; and
transmitting a downlink user data packet, of the downlink data transmission indicated in the page, to the UE in response to the random access preamble from the UE or a random access response message while the UE remains in the RRC inactive mode and without transitioning the UE to an RRC connected mode.

27. The method of claim 26, further comprising:
transmitting a configuration for random access resources and the random access preamble in the page to the UE.

28. The method of claim 26, wherein the downlink user data packet is transmitted in response to the random access preamble.

29. The method of claim 26, further comprising:
transmitting the random access response message to the UE in response to receiving the random access preamble; and
receiving a resume message from the UE prior to transmitting the downlink user data packet, wherein the downlink user data packet is transmitted in response to the resume message from the UE.

30. The method of claim 29, wherein the resume message comprises an indication that the UE will receive data while remaining in the RRC inactive mode.

31. The method of claim 26, further comprising:
ciphering the downlink user data packet using a security key based on a UE context stored at the base station.

32. The method of claim 31, wherein the security key is derived using a Next hop Chaining Counter (NCC) provided to the UE in connection with entering the RRC inactive mode.

33. The method of claim 32, further comprising:
indicating a new NCC to the UE in a message with the downlink user data packet.

34. The method of claim 26, wherein the downlink user data packet is transmitted over a signal bearer.

35. The method of claim 26, wherein the downlink user data packet is transmitted over a default bearer.

36. The method of claim 26, further comprising:
scrambling a cyclic redundancy check (CRC) for downlink control information (DCI) associated with the downlink user data packet using a Radio Network Temporary Identifier (RNTI) for the UE, wherein the RNTI comprises a Cell RNTI (C-RNTI) from a stored UE context or a new RNTI indicated to the UE in the page.

37. The method of claim 26, further comprising:
receiving, from an anchor cell, a paging indication to page the UE, wherein the base station determines the random access preamble and random access resources to configure for the UE.

38. The method of claim 37, wherein the base station receives an un-ciphered downlink user data packet, and wherein the paging indication further comprise a Cell Radio Network Temporary Identifier (C-RNTI) from a stored UE context and a security key based on the stored UE context, the method further comprising:

ciphering the downlink user data packet using the security key received from the anchor cell.

39. The method of claim 37, wherein the paging indication further comprise a Cell Radio Network Temporary Identifier (C-RNTI) from a stored UE context, the method further comprising:
receiving the downlink user data packet from the anchor cell prior to transmission of the downlink user data packet to the UE, wherein the downlink user data packet is ciphered using a security key from the stored UE context.

40. The method of claim 37, further comprising:
receiving, from the UE, an acknowledgement of a successful reception of the downlink user data packet; and
transmitting, to the anchor cell, an indication of the successful reception of the downlink user data packet by the UE.

41. The method of claim 26, further comprising:
transmitting a response to the random access preamble received from the UE, the response indicating a fallback to establish an RRC connection in order to transmit the downlink user data packet, wherein the downlink user data packet is transmitted after the UE transitions to the RRC connected mode when the base station determines a need for the fallback to transmission in the RRC connected mode.

42. An apparatus for wireless communication at a base station, comprising:
means for transmitting a page to a User Equipment (UE) in a Radio Resource Control (RRC) inactive mode for a downlink data transmission;
means for receiving a random access preamble from the UE in response to the page; and
means for transmitting a downlink user data packet, of the downlink data transmission indicated in the page, to the UE in response to the random access preamble from the UE or a random access response message while the UE remains in the RRC inactive mode and without transitioning the UE to an RRC connected mode.

43. The apparatus of claim 42, further comprising:
means for transmitting a configuration for random access resources and the random access preamble in the page to the UE.

44. The apparatus of claim 42, further comprising:
means for transmitting the random access response message to the UE in response to receiving the random access preamble; and
means for receiving a resume message from the UE prior to transmitting the downlink user data packet, wherein the downlink user data packet is transmitted in response to the resume message from the UE.

45. The apparatus of claim 42, further comprising:
means for ciphering the downlink user data packet using a security key based on a UE context stored at the base station.

46. The apparatus of claim 45, wherein the security key is derived using a Next hop Chaining Counter (NCC) provided to the UE in connection with entering the RRC inactive mode, the apparatus further comprising:
means for indicating a new NCC to the UE in a message with the downlink user data packet.

47. The apparatus of claim 42, further comprising:
means for scrambling a cyclic redundancy check (CRC) for downlink control information (DCI) associated with the downlink user data packet using a Radio Network Temporary Identifier (RNTI) for the UE, wherein the RNTI comprises a Cell RNTI (C-RNTI) from a stored UE context or a new RNTI indicated to the UE in the page.

48. The apparatus of claim 42, further comprising:
means for receiving, from an anchor cell, a paging indication to page the UE, wherein the base station determines the random access preamble and random access resources to configure for the UE.

49. The apparatus of claim 48, wherein the base station receives an un-ciphered downlink user data packet, and wherein the paging indication further comprise a Cell Radio Network Temporary Identifier (C-RNTI) from a stored UE context and a security key based on the stored UE context, the apparatus further comprising:
means for ciphering the downlink user data packet using the security key received from the anchor cell.

50. The apparatus of claim 48, wherein the paging indication further comprise a Cell Radio Network Temporary Identifier (C-RNTI) from a stored UE context, the apparatus further comprising:
means for receiving the downlink user data packet from the anchor cell prior to transmission of the downlink user data packet to the UE, wherein the downlink user data packet is ciphered using a security key from the stored UE context.

51. The apparatus of claim 48, further comprising:
means for receiving, from the UE, an acknowledgement of a successful reception of the downlink user data packet; and
means for transmitting, to the anchor cell, an indication of the successful reception of the downlink user data packet by the UE.

52. The apparatus of claim 42, further comprising:
means for transmitting a response to the random access preamble received from the UE, the response indicating a fallback to establish an RRC connection in order to transmit the downlink user data packet, wherein the downlink user data packet is transmitted after the UE transitions to the RRC connected mode when the base station determines a need for the fallback to transmission in the RRC connected mode.

53. An apparatus for wireless communication at a base station, comprising:
memory; and
at least one processor coupled to the memory and configured to cause the base station to:
transmit a page to a User Equipment (UE) in a Radio Resource Control (RRC) inactive mode for a downlink data transmission;
receive a random access preamble from the UE in response to the page; and
transmit a downlink user data packet, of the downlink data transmission indicated in the page, to the UE in response to the random access preamble from the UE or a random access response message while the UE remains in the RRC inactive mode and without transitioning the UE to an RRC connected mode.

54. The apparatus of claim 53, wherein the at least one processor is further configured to cause the base station to:
transmit a configuration for random access resources and the random access preamble in the page to the UE.

55. The apparatus of claim 53, wherein the at least one processor is further configured to cause the base station to:
transmit the random access response message to the UE in response to receiving the random access preamble; and
receive a resume message from the UE prior to transmitting the downlink user data packet, wherein the downlink user data packet is transmitted in response to the resume message from the UE.

56. The apparatus of claim 53, wherein the at least one processor is further configured to cause the base station to:
cipher the downlink user data packet using a security key based on a UE context stored at the base station.

57. The apparatus of claim 56, wherein the security key is derived using a Next hop Chaining Counter (NCC) provided to the UE in connection with entering the RRC inactive mode, wherein the at least one processor is further configured to cause the base station to:
indicate a new NCC to the UE in a message with the downlink user data packet.

58. The apparatus of claim 53, wherein the at least one processor is further configured to cause the base station to:
scramble a cyclic redundancy check (CRC) for downlink control information (DCI) associated with the downlink user data packet using a Radio Network Temporary Identifier (RNTI) for the UE, wherein the RNTI comprises a Cell RNTI (C-RNTI) from a stored UE context or a new RNTI indicated to the UE in the page.

59. The apparatus of claim 53, wherein the at least one processor is further configured to cause the base station to:
receive, from an anchor cell, a paging indication to page the UE, wherein the base station determines the random access preamble and random access resources to configure for the UE.

60. The apparatus of claim 59, wherein the base station receives an un-ciphered downlink user data packet, and wherein the paging indication further comprise a Cell Radio Network Temporary Identifier (C-RNTI) from a stored UE context and a security key based on the stored UE context, wherein the at least one processor is further configured to cause the base station to:
cipher the downlink user data packet using the security key received from the anchor cell.

61. The apparatus of claim 59, wherein the paging indication further comprise a Cell Radio Network Temporary Identifier (C-RNTI) from a stored UE context, wherein the at least one processor is further configured to cause the base station to:
receive the downlink user data packet from the anchor cell prior to transmission of the downlink user data packet to the UE, wherein the downlink user data packet is ciphered using a security key from the stored UE context.

62. The apparatus of claim 59, wherein the at least one processor is further configured to cause the base station to:
receive, from the UE, an acknowledgement of a successful reception of the downlink user data packet; and
transmit, to the anchor cell, an indication of the successful reception of the downlink user data packet by the UE.

63. The apparatus of claim 53, wherein the at least one processor is further configured to cause the base station to:
transmit a response to the random access preamble received from the UE, the response indicating a fallback to establish an RRC connection in order to transmit the downlink user data packet, wherein the downlink user data packet is transmitted after the UE transitions to the RRC connected mode when the base station determines a need for the fallback to transmission in the RRC connected mode.

64. A non-transitory computer-readable medium storing computer executable code for wireless communication at a base station, the code when executed by at least one processor causes the base station to:
transmit a page to a User Equipment (UE) in a Radio Resource Control (RRC) inactive mode for a downlink data transmission;
receive a random access preamble from the UE in response to the page; and
transmit a downlink user data packet, of the downlink data transmission indicated in the page, to the UE in response to the random access preamble from the UE or a random access response message while the UE remains in the RRC inactive mode and without transitioning the UE to an RRC connected mode.

\* \* \* \* \*